No. 777,294.

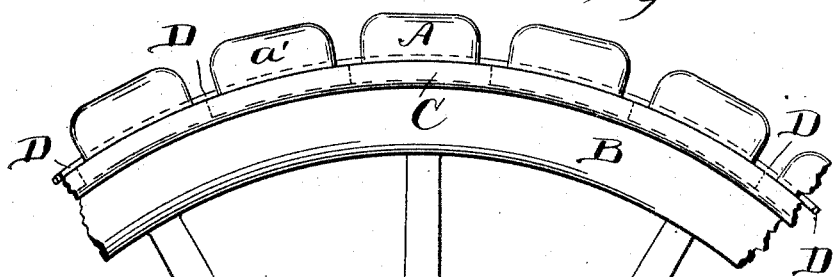
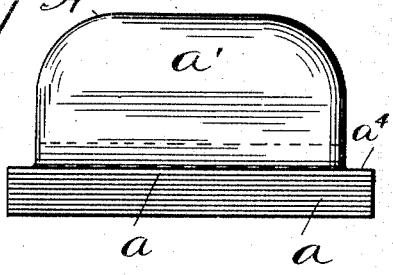
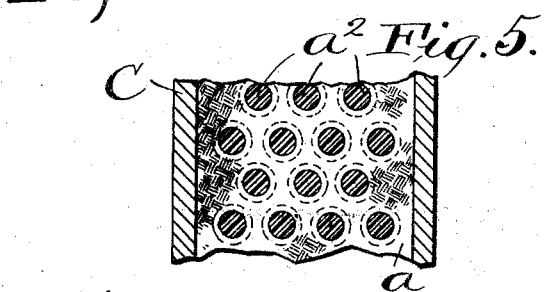
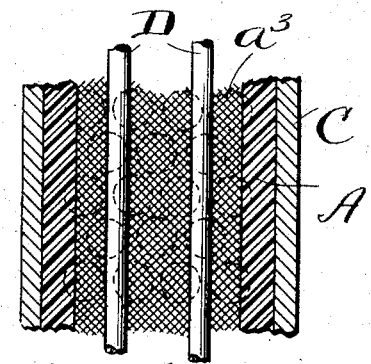

Patented December 13, 1904.

UNITED STATES PATENT OFFICE.

ARTHUR H. MARKS, OF AKRON, OHIO.

VEHICLE-TIRE.

SPECIFICATION forming part of Letters Patent No. 777,294, dated December 13, 1904.

Application filed March 14, 1904. Serial No. 197,924. (No model.)

*To all whom it may concern:*

Be it known that I, ARTHUR H. MARKS, a citizen of the United States, residing at Akron, in the county of Summit and State of Ohio, have invented a certain new and useful Improvement in Vehicle-Tires, of which the following is a full, clear, and exact description, reference being had to the accompanying drawings.

The object of this invention is to produce a durable and efficient rubber-pad tire.

Tires of the pad type have an advantage over the continuous tire in that individual sections which have become injured can be replaced, and, moreover, because a better tractive effect is obtained. The projections of the road enter the spaces between the pads, so that they obtain a better hold on the roadway. Individual pads, however, are subjected to such strains by reason of this very fact of their corners striking the roadway that they are liable to become torn from the wheel.

By the present invention I provide resilient separate pads combined with means for holding them to the rim, which have been demonstrated to be very efficient—namely, a pair of continuous retaining-wires passing around the rim. In order that such retaining-wire shall not pull through the base of the pad, I make that base of comparatively stiff material, as superimposed layers of fabric, of cloth, or woven wire, and such base portion I interlock to the resilient tread by projections on one portion which enter the other—as, for example, dovetailed tongues of the rubber which extend down into the base portion. By this means I am enabled to obtain very strong and durable pads, whose treads have the desired elasticity, while their bases are stiff. The pads are placed around the wheel-rim with their resilient portions separated from each other and are held by the retaining-wires. The separation of the resilient portions may be caused, for example, by having the base of each pad project longitudinally beyond the tread portion, the bases of consecutive pads abutting when the tire is in place.

The drawings clearly disclose my invention.

Figure 1 is a side elevation of a wheel-rim equipped with my pads. Fig. 2 is a transverse section thereof. Fig. 3 is a side elevation of one of the pads removed. Figs. 4 and 5 are sectional plans on the correspondingly-numbered lines of Fig. 2.

Referring to the parts by letters, A represents one of the tire-pads, which consists of a base portion $a$, which is made of some comparatively stiff material, as superimposed layers of fabric, either of canvas or woven wire, and a tread portion $a'$, which is of resilient rubber. This tread portion is interlocked to the base portion by projections extending thereinto and the whole vulcanized together. If the base portion is made of canvas, special holes are made through it flaring downwardly, and into these holes rubber tongues $a^2$ of the tread portion extend, the holes being placed in staggered position, as shown. If the base is of woven-wire fabric, the rubber may simply pass through the interstices of the fabric.

B represents the wheel-felly, and C a channel-shaped rim surrounding the same. In this rim seat the pads A, constituting my tire.

In order that the pads may obtain desirable hold on the roadway, it is intended that their treads should be some distance apart. To prevent them slipping lengthwise, however, the pads should be rigidly spaced by suitable distance members at their bases. Such distance members may be efficiently provided by extending the base portion lengthwise beyond the tread, as at $a^4$ in Figs. 1 and 3. When the base is so extended, the bases of consecutive pads abut each other, wherefore there is no chance for longitudinal slipping.

To hold the tire on the rim, I provide a pair of retaining-wires D. These are shown as passing through the pads. They extend entirely around the wheel, and their ends are welded or otherwise secured together to make an endless band. Beneath the wires in the pads to insure their not wearing downward through the tire I provide a piece of woven-wire fabric $a^3$.

When pads have become so worn or injured that they need replacement, the wires D may be cut adjacent to any pad to be removed and after a new pad is slipped in place the wire welded together. The stiff bases of the pads prevent their twisting within the channel's rim, also prevent the retaining-wires working down through the pad, and the pads are very rigidly and securely retained in place, thus giving great durability to the tire.

Having described my invention, I claim—

1. A tire consisting of pads each having a relatively tough and stiff base portion composed of a plurality of superimposed layers and a resilient tread portion, said two portions of the tire being interlocked by means of homogeneous tongues which extend down from the tread portion into the base portion.

2. A tire composed of pads each having a relatively tough and stiff base portion, built up for substantially its entire height of a series of superimposed layers which extend clear across the base of the tire, and a resilient tread portion interlocked to the base by having tongues extending down into it.

3. A rubber tire composed of pads each having a stiff base consisting of a plurality of superimposed layers of fabric and a resilient tread which extends down into said base and immutably interlocks with the base, a pair of retaining-wires extending longitudinally of the pads for holding them in place, and means for keeping the treads of said pads separated.

4. A vulcanized-rubber tire composed of pads each having a resilient tread portion and a relatively tough and stiff base portion, which two parts are interlocked by means of undercut holes in the base portion and dovetailed tongues, which are homogeneous parts of the tread portion, and which project down into and fill said holes.

5. A rubber tire composed of pads each having a flexible tread portion, and a relatively stiff base which is composed entirely of superimposed layers extending entirely across the base and interlocked with said tread portion by means of projections on one part which enter holes in the other part, combined with a wheel-rim having outwardly-flaring side flanges which are fitted to the sides of the base, and two fastening-wires extending through the pads and resting upon the bases thereof, and means holding the treads of consecutive pads separated.

6. A wheel-tire composed of pads each having a relatively tough stiff base portion, and a tread portion secured thereto and composed of resilient rubber compound, and a strip of woven-wire fabric embedded in the tread portion and close to the base portion, combined with a wire fastening device which engages with said wire fabric strip.

7. A vulcanized-rubber tire composed of pads each having flexible tread portion, and a relatively stiff base having a plurality of undercut holes which are staggered in respect to those in adjacent transverse rows, and said tread portion having homogeneous dovetailed tongues which project into said holes.

In testimony whereof I hereunto affix my signature in the presence of two witnesses.

ARTHUR H. MARKS.

Witnesses:
   H. A. MacKusick,
   D. Galehouse.